3,410,777
GLASS ELECTRODE COMPOSITION
James W. Ross, Newton, Mass., assignor to Corning Glass Works, Corning, N.Y., a corporation of New York
No Drawing. Original application May 18, 1964, Ser. No. 368,322. Divided and this application Aug. 19, 1964, Ser. No. 394,098
3 Claims. (Cl. 204—195)

This application is a division of application Ser. No. 368,322, filed May 18, 1964.

This invention relates to pH-responsive glass electrodes, and more particularly to glass electrodes having pH-sensitive glass membranes of novel composition.

In the measurement of pH with glass electrodes, it is desired that variations in potential across the glass membrane be due to changes in the concentration of hydrogen ion in the test fluid to which the membrane is exposed, and not affected by the presence of other ions in the test fluid. The presence of ions of alkali metals has been a major factor in introducing unwanted deviations into such pH measurements, particularly in solutions exhibiting alkaline pH. The reduction of the effect of such deviations (which are collectively known as alkaline error and most usually referred to as "sodium error" because of the ubiquitousness of sodium in most common solutions) has been the subject of much prior art.

It has been found as long ago as 1932 by Sokolov that lithia pH glass (a pH glass in which the $Na_2O$, for example, has essentially been replaced with $Li_2O$) could be formed into an electrode which exhibited a markedly reduced sodium error. Specifically, Sokolov was concerned with an Li(18)Ca(10)Si(72) glass (the numerals being indicative of the mol percentages of the particular components expressed as oxides). Sometime later, McInnis and Dole melted a similar lithia glass, Li(36)Ca(5)Si(59). U.S. Patent No. 2,462,843 issued to H. Cary et al. on Mar. 1, 1949, has claims directed toward lithia glasses in which the mol percentages of the components lie generally between the Sokolov, and McInnis and Dole glasses. The present invention is directed toward glass compositions useful for forming low sodium error pH glasses and electrodes formed of such glasses. Particularly, the glass electrodes of the present invention are characterized in having very low sodium error, comparatively low bulk resistivities with improved lamp workability, and enhanced durability with respect to the electrodes of the prior art. The voltage/pH characteristics of electrodes of the present invention are substantially free of perturbations due to sodium error throughout the entire range from about pH 0.5 to pH 14, and are of superior reproducibility in this respect. The voltage/pH characteristics are essentially linear over the foregoing range and are, as expected, about 59 mv./pH unit at 25° C.

Other objects of the present invention will in part be obvious and will in part appear hereinafter. The invention, accordingly, comprises the products possessed, the features, properties and relation of components which are exemplified in the following detailed disclosure, and the scope of the application of which will be indicated in the claims.

In its broader aspects, the present invention, exemplified by glass electrodes, can be characterized broadly as being directed toward lithia-silicate glass membranes provided from a pre-melt composition or mixture according to the following general five-component formulation:

(1) Silica;
(2) Lithia;
(3) One or more oxides of the rare earth metals, e.g., lanthanum, praesodymium, etc;
(4) One or more oxides of the alkali metals of the group of cesium and rubidium; and
(5) One or more oxides of the metals of the group of uranium and tantalum.

The lithia is believed to provide glass having substantially lower sodium error than comparable glasses using natria in place of the lithia. The addition of the rare earth metal oxide is believed to contribute to lower resistivity and increased workability for the glass. The heavier alkali oxides are added in order to markedly enhance or alter the ordinary effect of the lithia so as to provide a glass having a sodium error which is substantially less than ordinary lithia pH glasses. In the present invention, the uranium oxide, although in comparatively small quantity (e.g., 1–3 mol percent) not only provides enhancement of workability of such glass, but lowering of the bulk resistivity, and considerable and quite unexpected improvement of the durability of the glass. The silica, of course, provides the fundamental glassy lattice.

Glasses of the type thus described typically have a liquidus temperature of around 1150° C. Below this temperature, the melt will tend to have crystals (probably lanthanum silicate) form therein and coalesce. If the melt temperature then rises to above 1150° C. approximately, these crystals will dissolve. This crystalizing tendency at high temperature causes inhomogeneities in the glass, and ion-sensitive membranes formed from such glass are often of unpredictable quality. It has been found that the addition of tantalum oxide in small quantities (e.g., 1–3 mol percent) will prevent this phenomenon, as does the addition of uranium oxide at, for example, a level of about 6 mol percent, or a combination of the two oxides. However, the use of uranium oxide alone in amounts of 6 mol percent tends to cause an increase in the sodium error of the resulting glass, so the use of tantalum oxide alone or with small quantities of uranium oxide (e.g., about 3 mol percent) is preferred.

Generally, then, the electrode glass of the present invention is exemplified by the following formula, expressed in ranges of mol percentages of oxides:

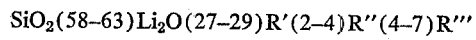

$$SiO_2(58-63)Li_2O(27-29)R'(2-4)R''(4-7)R'''$$

where R' is either one or both oxides selected from the group consisting of $Rb_2O$ and $Cs_2O$, R'' is one or more rare earth metal oxides, and R''' is alternatively either about 1– mol percent $UO_2$, about 13–3 mol percent $Ta_2O_5$, or from about 1–6 mol percent of a mixture of one or two in which neither one is present at more than about 3 mol percent.

It will be seen that glasses according to the foregoing general formulation conspicuously omit any alkaline earth metal oxides which have heretofore been a common constituent of pH-sensitive glasses and have been considered an important factor in reducing sodium error. Particularly, such glasses containing alkaline earth metal oxides are discussed in the aforesaid U.S. Patent No. 2,462,843.

Referring to the following Table I, there is shown a number of pre-melt compositions of glasses, both those which are preferred and additional glasses comprehended by the invention, useful in forming pH-responsive membranes of electrodes. Each of the components is expressed in terms of the mol percentage of a specific oxide for the sake of clarity and simplicity, but it is to be understood that the components can be mixed initially from any compound which will yield an oxide upon fusion. For example, lithium carbonate is preferred as an initial material rather than lithium oxide because of its availability and relative inertness. Thus, carbonates, hydroxides, nitrates, and other such compounds can be used.

TABLE I
[Compositions in Mol Percentage]

| No. | SiO₂ | Li₂O | Cs₂O | La₂O₃ | UO₂ | Ta₂O₅ |
|---|---|---|---|---|---|---|
| 1 | 60 | 27 | 4 | 7 | 2 | 0 |
| 2 | 62 | 27 | 2 | 7 | 0 | 2 |
| 3 | 63 | 27 | 4 | 4 | 0 | 2 |
| 4 | 58 | 27 | 4 | 7 | 2 | 2 |
| 5 | 60 | 27 | 3 | 6 | 2 | 2 |
| 6 | 58 | 29 | 4 | 7 | 2 | 0 |
| 7 | 62 | 27 | 2 | 7 | 2 | 0 |
| 8 | 63 | 27 | 4 | 4 | 2 | 0 |
| 9 | 60 | 27 | 4 | 7 | 0 | 2 |

The representative glasses of Table I, upon testing, showed the following characteristics:

TABLE II

| No. | Resistivity at 25° C. | Resistivity at 100° C. | Acid Durab. | Neutral Durab. | Alkali Durab. | Sodium Error |
|---|---|---|---|---|---|---|
| 1 | 11.01 | 8.38 | 0.167 | 0.059 | 0.085 | 4 |
| 2 | 10.1 | 7.68 | 0.078 | 0.067 | 0.073 | 10 |
| 3 | 10.27 | 7.72 | 0.101 | 0.108 | 0.139 | 2 |
| 4 | 10.61 | 8.04 | 0.108 | 0.058 | 0.066 | <10 |
| 5 | 10.51 | 7.98 | 0.121 | 0.070 | 0.084 | 8 |
| 6 | 10.5 | 7.96 | | | | 16 |
| 7 | 10.58 | 7.77 | | | | 16 |
| 8 | 10.32 | 7.80 | | | | 22 |
| 9 | 10.91 | 8.22 | | | | <10 |

Resistivities in Table II are expressed as log ρ. Durability is expressed as a percentage measured according to the results of the standard ASTM test of the percentage of alkali (computed as Na₂O) reached due to soaking of comminuted material in a solution for a predetermined period (e.g., 4 hours) at a fixed temperature (e.g., 90° C.). Acid durability was measured using a solution of 0.02 N H₂SO₄ neutral durability in pH 7 water; and alkali durability in a solution of 0.01 N NaOH. Sodium error is expressed in millivolts deviation from the electrode response to an alkali-free solution (positive if lower than theoretical) due to contact with a solution of 1 M NaOH at 25° C. While the last four glass compositions listed were not tested for durability data, it is expected that such data would fully accord with the results obtained with the other glasses.

According to Sult's et al., Vestnik Leningrad University, No. 4, 155 (1963), the minimum sodium error in a lithia-silica-cesia-rare earth metal oxide glass system is found in a composition of about the following mol percentages:

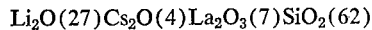
Li₂O(27)Cs₂O(4)La₂O₃(7)SiO₂(62)

Electrodes prepared according to this composition showed a very low sodium error (approximately 20 mv. in 1 M NaOH) in agreement with the data of Shult's. However, this glass was difficult to work showing a strong tendency to devitrify, and exhibited an undesirable high electrical resistivity (log ρ at room temperature was 11.16). Additionally, the durability of this glass was found to be (when tested according to criteria of Table II), 0.156 in acid, 0.101 in pH 7 water, and 0.139 in base, quite poorer than the glasses of Table II. Although glass #1 of Table II differs from Shult's glass only in the addition of 2 mol percent UO₂ and the corresponding decrease in silica content, the reduction in sodium error and the improvement in durability were quite unexpected.

For purposes of comparison, a number of other glasses were tested. Two (denoted A and B in the following table) were low sodium error glass of the lithia-silica-alkali earth metal oxide composition of prior art, having current usage in pH electrodes. One (denoted C in Table III) was a general purpose laboratory glass, and another (denoted D in Table III) was another low sodium error glass of the lithia-silica-rare earth metal oxide-heavy alkali oxide type exemplified in U.S. Patent No. 2,444,845 issued July 6, 1948, to G. A. Perley. Each such glass was tested for durability in the same manner as hereinbefore described in connection with the glasses of Table II, and with the following result:

TABLE III

| Compositions in Mol Percentage | Acid Durab. | Neutral Durab. | Alkali Durab. | Published Sodium Error |
|---|---|---|---|---|
| A. Li₂O (24.1), BaO (5.4), La₂O₃ (4.3), CeO (4.3), SiO₂ (66.2) | 0.070 | 0.130 | 0.120 | 12 |
| B. Li₂O (25.4), BaO (6.9), La₂O₃ (4.5), CeO (4.5), SiO₂ (63.2) | 0.072 | 0.120 | 0.132 | 12 |
| C. Li₂O (30), BaO (2.7), La₂O₃ (1.9), SiO₂ (65.3) | 0.434 | 0.616 | 0.665 | >60 |
| D. Li₂O (25.5), Cs₂O (1.6), La₂O₃ (2.1), BaO (3.4), SiO₂ (67.4) | 0.185 | 0.38 | 0.428 | 18 |

It will thus be seen that the glasses of the present invention exhibit superior durability, in both neutral and alkaline media, over the prior art glasses, and exhibit sodium errors which are quite low and in some instances as good as the best of the prior art glasses. Additionally, it will be seen that the resistivities of some of the glasses of the present invention are quite as low as the better prior art pH glass.

Inasmuch as impurities in pH glass mixtures tend to provide unpredictable and usually undesired consequences, preparation of the melt should be from so-called "C.P." grade raw materials. For the same reason, it is preferred to make the melt in a comparatively chemically inert container. Methods of making glass pH-responsive electrodes from the molten glass, and testing and using such electrodes are well detailed in both the prior art texts and patent literature, so need not be described here.

As used in the claims hereinafter set forth, the phrase "at least one" is intended to mean both the use of qualified group as well as any single material of the group.

Since certain changes may be made in the above product without departing from the scope of the invention herein involved, it is intended that all matter contained in the above description shall be interpreted in an illustrative and not in a limiting sense.

What is claimed is:

1. A glass electrode including a pH responsive membrane of glass having a composition consisting essentially of about 27 to 29 mol percent Li₂O; about 2 to 4 mol percent of at least one material selected from the group consisting of Cs₂O and Rb₂O; about 4 to 7 mol percent of at least one rare earth metal oxide; about 1 to 3 mol percent of UO₂; and the balance being SiO₂.

2. A glass electrode as defined in claim 1 wherein said rare earth metal oxide is selected from the group consisting of La₂O₃ and Pr₂O₃.

3. A glass electrode having a pH responsive membrane of glass having a composition consisting essentially of about 27–29 mol percent Li₂O, 58 to 63 mol percent SiO₂, 2 to 4 mol percent Cs₂O, 4 to 7 mol percent La₂O₃, and about 1–3 mol percent UO₂.

References Cited

UNITED STATES PATENTS

| 2,444,845 | 7/1948 | Perley | 204—195 |
| 2,497,235 | 2/1950 | Perley | 204—195 |
| 3,238,050 | 3/1966 | Arthur et al. | 204—195 |

JOHN H. MACK, *Primary Examiner.*

T. TUNG, *Assistant Examiner.*